Dec. 29, 1931. H. P. ROBBINS 1,838,190
BELT CONVEYER IDLER
Original Filed July 24, 1929 2 Sheets-Sheet 1
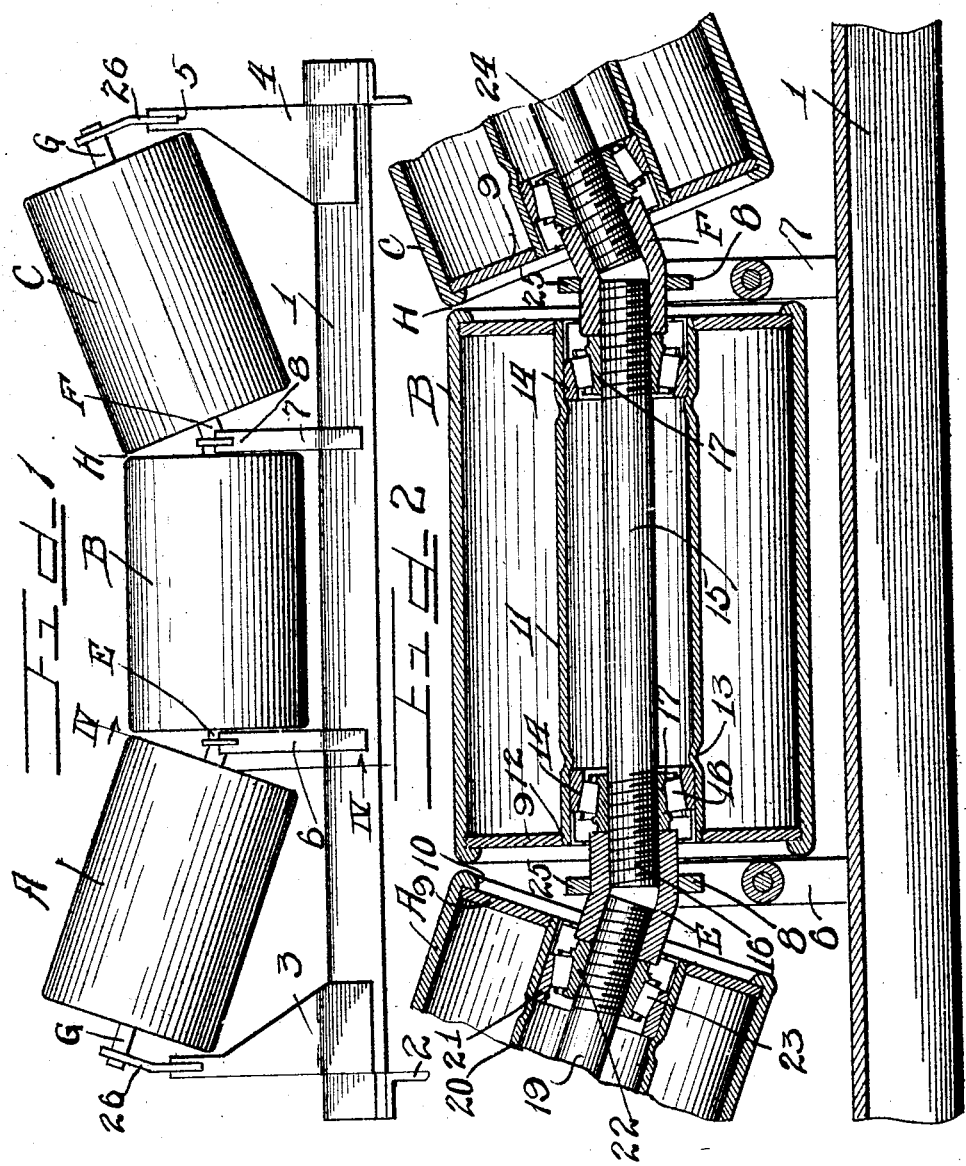

Dec. 29, 1931.  H. P. ROBBINS  1,838,190
BELT CONVEYER IDLER
Original Filed July 24, 1929  2 Sheets-Sheet 2
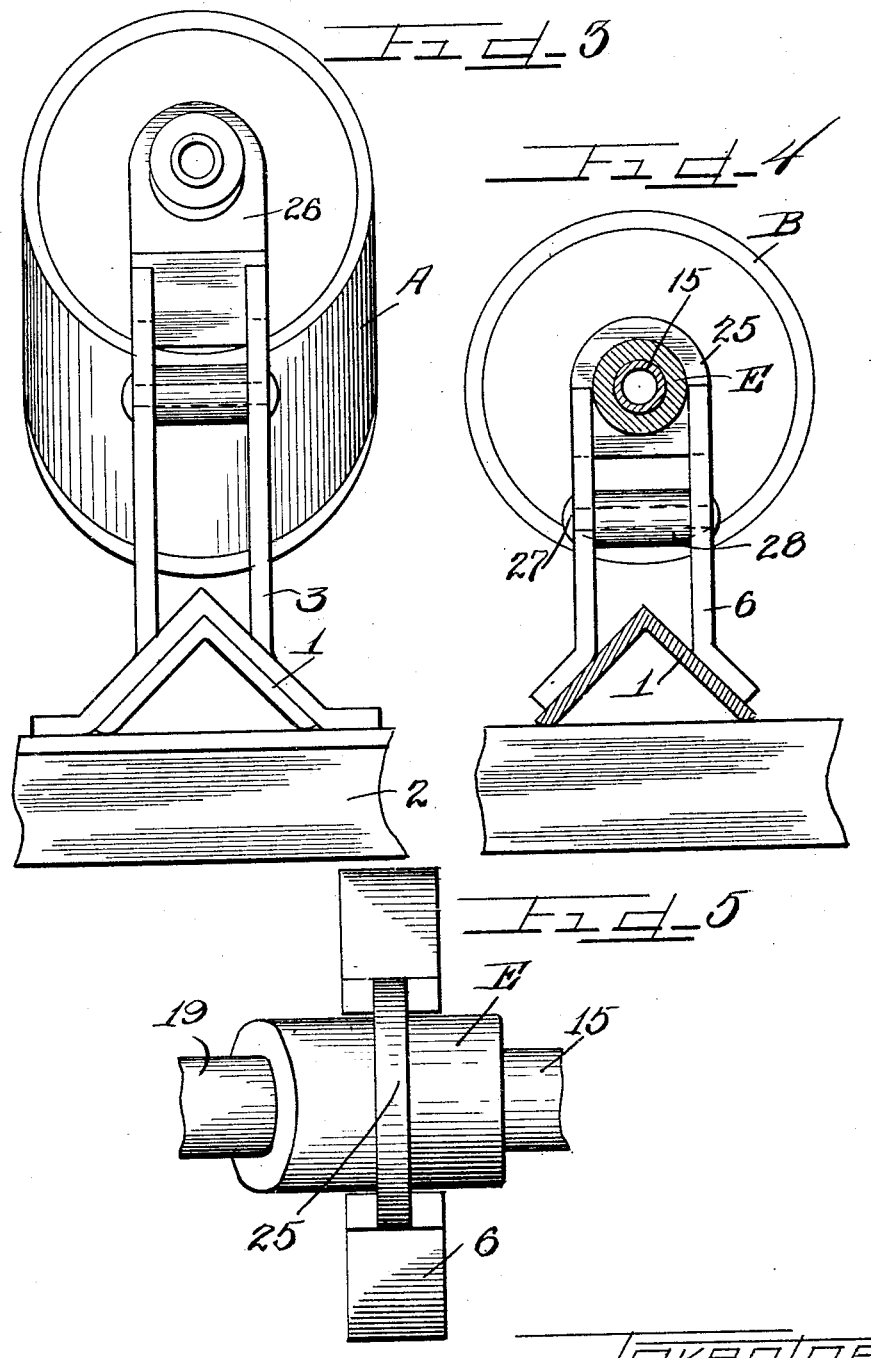

Patented Dec. 29, 1931

1,838,190

UNITED STATES PATENT OFFICE

HUGH P. ROBBINS, OF CHICAGO, ILLINOIS

BELT CONVEYER IDLER

Application filed July 24, 1929, Serial No. 380,473. Renewed November 11, 1931.

The invention relates to a belt conveyer idler and particularly to one wherein the rollers may be bodily removed and replaced as a unit and in which anti-friction bearings are employed for supporting the rollers and which bearings are capable of adjustment so as to allow closer end spacing between the several rollers of a unit.

Conveyer idlers are made usually with three or five idler pulleys to a unit with the middle or central roller arranged on a horizontal axis and the others set at various degrees with respect to the middle. The idlers made at the present time necessarily have to have some degree of end spacing between the several rollers of the unit with the result that the conveyer belt when loaded has a tendency to be depressed into these spaces between the several rollers and thus wear the belt more quickly than at other points.

This invention is directed to an idler wherein the unit as a whole is so connected as to be removed from and replaced in the idler unit supports as a unit and in which the rollers of a unit are arranged with minimum endwise spacing between the same.

An object of the invention is to provide an arrangement of belt conveyer idler units of rollers in fixed angular relation whereby the unit may be readily removed and installed.

A further object of the invention is to provide anti-friction bearings for supporting the idler rollers, which bearings are threaded onto the supporting shafts for the purposes of adjustment.

A still further object of the invention is to provide a connector for the rollers of an idler unit whereby the unit as a whole may be readily removed or installed.

The above, other and further objects of the invention will be apparent from the following description, accompanying drawings and appended claims.

According to the invention, the idler unit includes a plurality of rollers, the middle of which is arranged on a horizontal axis and the end rollers arranged at an inclination to the axis of the middle roller. The rollers are supported on anti-friction bearings, which are threaded onto the roller shafts and connectors between adjacent rollers whereby the angularity is maintained in fixed relation and whereby endwise adjustment of the bearings is accomplished.

The form of the apparatus chosen to exemplify the invention is illustrated in the accompanying drawings and the views thereof are as follows:

Figure 1 is a front elevational view of a conveyer idler embodying this invention.

Figure 2 is an enlarged fragmental vertical central section through the apparatus of Figure 1.

Figure 3 is an end view of the unit.

Figure 4 is a section taken on line IV—IV of Figure 1.

Figure 5 is a top plan view of a connector forming a part of this invention.

It is essential that in certain kinds of conveyer belt installations that little surface be utilized for the base surface of the idler units to prevent accumulation of dirt or other matter which is detrimental to the operation of the conveyer.

The form of conveyer idler illustrated includes a base or frame member 1 which is an inverted angle iron supported on frame members 2.

Attached by welding, riveting or the like near each end of the angle frame member 1 are idler unit supports 3 and 4 which are made of plate material with the lower ends of the same bent to conform to the shape of the angle iron member 1 and thereto secured in any suitable manner. The upper ends of each of these members is slotted at 5 for a purpose to be hereinafter more fully described. A connecting bolt or rivet 27 supporting a spacer 28 connects the supports for strengthening the same.

Intermediate supporting members 6 and 7 of strap iron or like material are provided with the ends bent outwardly and securely fastened to the angle frame member 1, as clearly shown in Figure 4. The supports 6 and 7 are not as high as the end supports 3 and 4. The upper ends of the supports 6 and 7 are likewise slotted at 8.

There are shown three rollers A, B, and C with B the middle or horizontal roller and A and C the end rollers disposed at an angle to the middle roller B.

The several rollers are made preferably as shells or tubes with end discs 9 inserted against the rolled over end flanges 10 of the several rollers.

Tubes 11 are threaded into central apertures 12 of the end discs 9. The tubes 11 are formed inwardly of the ends thereof with indentations 13 for providing shoulders near the ends of the tubes.

Outer bearing race members 14 are inserted in the ends of the tubes 11 and brought to rest against the shoulders 13.

The middle roller B is supported on a hollow shaft 15 which has its ends threaded at 16 and which threaded ends support threaded bearing cages 17 which carry the anti-friction bearings 18. One of the cages 17 is screwed onto one end of the shaft 15 and the shaft inserted through its end of the tube 11 until the bearings 18 engage the outer bearing race member 14, whereupon the bearing cage members 17 at the opposite end is screwed onto the threaded end of the shaft at that end with the bearings 18 thereof in engagement with the outer race member 14. The cages 17 may be adjusted by screwing same in either direction along the shaft 15 to center the roller on the shaft 15. The shoulders 13 limit the inward movement of the bearing races, but the races may be positioned away from such shoulders if necessary to properly support the rollers in endwise adjusted position.

The roller A is provided with a hollow shaft 19, a similar tube 20, outer bearing race members 21, bearing cage 22, bearings 23 with the bearings adjusted in the same manner as described with reference to roller B.

In like manner roller C is equipped with hollow shaft 24, tube and bearings.

The shafts 15 and 19 and 24 are connected by bent couplers E and F, each of which couplers is made circular in cross-section with the interiors of the same threaded to engage the threaded ends of the shafts and with the same bent or otherwise formed to provide the desired angularity of arrangement of the several rollers when assembled.

The couplers E and F may be made as castings, of pipe or in any other suitable manner for the purpose intended.

The couplers E and F have an intermediate flange 25 between the ends of each of the couplers which flanges are integral with the couplers or inseparably united to the same.

Figure 4 illustrates an elevational view of the flange 25 of coupler E and shows the same to have a semi-circular upper end portion and a square lower portion, which square lower portion enters the slot 8 in the support 6. The flange 25 of the coupler F enters the slot 8 in the support 7.

End couplers G are provided of the same character as the couplers E and F, except that the same are not deflected in axial direction. Each of the couplers G has a flange 26 thereon which is bent in end elevation so that the lower ends thereof will enter the slots 5 in the end supports 3 and 4 vertically, while the upper ends of the flanges are perpendicular to the axes of the end rollers A and C.

The space H between the upper margins of the several rollers, that is the endwise space, should be small enough to prevent sagging of the belt into these spaces, thereby preventing damage to the belt, at the same time sufficient to allow proper operation of the rollers.

The couplers E and F are so designed as to length so that when the same are applied to the roller shafts in abutment with the cage members 17 and 22 of the bearings, the anti-friction bearings will be maintained in proper adjustment with the outer race members 14 and 21, at the same time the couplers will, by reason of the engagement with the cage members 17 and 22, space the rollers endwise according to the manner in which the couplers are designed. It is possible to make the couplers E and F of such length as to make the space represented by the reference character H very small, thereby reducing the wear of the conveyer belt to a minimum. Furthermore, this space may be small as no large supports are necessary for the units.

The arrangement of the length of the couplers E and F and the adjustment of the bearings is accomplished when the idler is designed and assembled, and once having been assembled no further adjustment is possible.

The rollers of a unit are arranged in the manner heretofore described with the end rollers A and C connected to the shaft 15 of the middle roller B by the couplers E and F whereupon the unit as a whole is installed in its base member by installing the unit with the flanges 25 and 26 entering the slots 8 and 5 respectively of the supports 6, 7, 3, and 4. Slight vertical movement of the unit accomplishes installation of the unit in its supports.

The roller unit is not fastened in any manner to the supports 3, 6, 7, and 4 but is installed by merely dropping the flanges 26 and 25 into the slots 5 of the end portions 3 and 4 and slots 8 of the intermediate supports 6 and 7. The weight of the unit is sufficient to retain it in position. Thus, no special couplers or connectors are required nor are any bolts or similar fasteners needed.

Should it be desired to remove the unit for any purpose whatsoever, then the whole unit may be lifted vertically until the flanges 25 and 26 are free of the slots for the same whereupon the idler may be removed and taken apart, which is easy to accomplish as the couplers E, F, and G are readily removable by proper tools.

The inclination of the axes of the rollers A and C may be made as desired, but it has been found that an inclination of approximately 20° to the horizontal is best practice.

It will be observed that the idler of this invention includes a unit of at least three rollers which may be bodily assembled, applied to a support and removed from the support with a minimum of labor so that when a unit is removed for repair or renewal, such repair or renewal may be quickly and economically accomplished because of the arrangement of the parts.

The use of the inverted angle iron A as a base prevents accumulation of dirt and the like underneath the rollers as any dirt there may be will fall away from the angle support 1 and therefore not accumulate underneath the rollers.

The lengths of the several rollers may be the same or different as any particular designer may think best.

There are, of course, as many idler units as necessary to properly support a conveyer belt in operative manner.

The rollers A, B, and C are shown as shells or tubes but of course may be solid, if desired, or may be made in any other suitable style. Furthermore, the end discs may be fitted to the tubes or rollers in any suitable manner.

The arrangement of the bearings within the tubes 11 and 20 prevents escape of lubricant entering the outer shells of the rollers. It is of course understood that the bearings are packed in grease or similar lubricant, and are so sealed as to retain the lubricant and to exclude dirt or other foreign matter from the bearings.

The screwing of the couplers E and F against the bearing members locks these parts in adjusted position.

Should finer adjustment be desired, or should it be desired to allow for wear then washers, if desired, may be inserted between the race members 17 and 22 and the ends of the couplers E and F.

The adjustment of the rollers endwise may be accomplished by retaining one of the couplers against rotation and rotating the other, thereby moving the connected shafts axially.

Lubricant is supplied to the bearings by being forced through the hollow shafts and couplers from the outer ends of the unit.

The invention has been described herein more or less precisely, yet it is to be understood that changes may be made in the arrangement and proportion of parts, and that equivalents may be substituted without departing from the spirit and scope of the invention.

The invention is claimed as follows:

1. A belt conveyer construction including a shaft comprising a plurality of shaft sections, connectors joining adjacent ends of the shaft sections and to support the sections in inclined relation to each other, the said connectors being threaded on the said shaft sections, other shaft-supporting members on the ends of the shaft, bearing members threaded on the shaft sections to abut the shaft connecting members whereby to retain the shaft sections in locked position in the said connecting members, rollers having internal shoulders to abut the said bearing members mounted on the said bearing members for rotation relative to the shaft, and means arranged to slidably receive and to seat the said supporting members so that the shaft may be installed in or removed from the receiving means as a unitary structure.

2. A belt conveyer idler construction including a shaft comprising a plurality of shaft sections, members threaded on the adjacent ends of the said shaft sections to connect them and to support them in inclined relation to each other, other shaft-supporting members on the ends of the shaft, the said last-named members each having a tongue with a bent portion extending therefrom, bearing members threaded on the said shaft sections to abut the said connecting members to retain the shaft sections in locked position in the connecting members, rollers mounted on the bearing members, a base, and spaced upstanding members having slots to slidably receive the tongue of the said supporting members, and arranged to retain the said tongue seated therein against end-thrust on the shaft, so that the said shaft and the supporting members thereon may be installed in or removed from the upstanding members as a unitary structure.

3. A belt conveyer idler unit including a shaft comprising a plurality of shaft sections, members receiving the adjacent ends of the said shaft sections to connect them and to support them in inclined relation to each other, the said members each having thereon an extending tongue, rollers rotatively mounted on the said shaft sections, other shaft supporting members receiving the ends of the shaft, a base, vertically upstanding members on the base, the said other supporting members on the ends of the shaft having extending tongues each including a portion normal to the shaft and a portion in alinement with the said upstanding members on the base, the said upstanding members being slotted to slidably receive the tongues on the supporting members.

In testimony whereof I have hereunto subscribed my name at Chicago, Cook County, Illinois.

HUGH P. ROBBINS.